US010332737B2

(12) United States Patent
Groves et al.

(10) Patent No.: US 10,332,737 B2
(45) Date of Patent: Jun. 25, 2019

(54) AUTOMATED TELESCOPIC LIGHTBULB ACCESS APPARATUS

(71) Applicant: Coconut Grover Industries LLC, Coral Gables, FL (US)

(72) Inventors: Brian D. Groves, Coral Gables, FL (US); Jorge Mariano Leon, Miami, FL (US)

(73) Assignee: Coconut Grover Industries LLC, Coral Gables, FL (US)

( * ) Notice: Subject to any disclaimer, the term of this patent is extended or adjusted under 35 U.S.C. 154(b) by 247 days.

(21) Appl. No.: 15/480,855

(22) Filed: Apr. 6, 2017

(65) Prior Publication Data

US 2018/0294150 A1 Oct. 11, 2018

(51) Int. Cl.
*B25J 1/04* (2006.01)
*H01J 9/00* (2006.01)
*H01K 3/32* (2006.01)
*F16D 1/112* (2006.01)

(52) U.S. Cl.
CPC ............... *H01K 3/32* (2013.01); *H01J 9/003* (2013.01); *F16D 1/112* (2013.01)

(58) Field of Classification Search
CPC ..... A47L 1/05; F16D 1/02; F16D 1/04; F16D 1/06; F16D 1/08; F16D 1/0847; F16D 1/0852; F16D 1/0894; F16D 1/10; F16D 1/112; F16D 2001/062; F16D 2001/102; H01J 9/003; H01K 3/32; H01K 7/003; Y10T 74/18344

USPC ................. 15/144.4; 294/184, 210; 464/182; 81/53.1, 53.12, 57.11
See application file for complete search history.

(56) References Cited

U.S. PATENT DOCUMENTS

| | | | | |
|---|---|---|---|---|
| 1,210,835 A | * | 1/1917 | Price ........................ | H01K 3/32 81/53.12 |
| 1,366,296 A | * | 1/1921 | Maciej ..................... | H01K 3/32 81/3.8 |
| 3,430,279 A | * | 3/1969 | Hintze ..................... | B24B 23/02 15/23 |

(Continued)

*Primary Examiner* — Joseph J Hail
*Assistant Examiner* — Arman Milanian
(74) *Attorney, Agent, or Firm* — Mark Terry

(57) ABSTRACT

A device for installing and removing lightbulbs comprises a removable gripping element including fingers configured for gripping a lightbulb, a telescopic cylinder coupled to the gripping element, wherein the telescopic cylinder is adjustable to different lengths, and a base housing, comprising: an electric motor located within the housing, a battery, a coupler for coupling the motor to the telescopic cylinder, the coupler comprising a tubular element, wherein the rotating shaft of the electric motor is inserted into an orifice in the first end, and wherein the second end is inserted into the proximal end of the telescopic cylinder, a cylindrical element that surrounds at least a portion of the tubular element, and at least one flange that connects the cylindrical element to the tubular element. The base housing also includes a switch on an exterior surface, the switch for activating power to the electric motor, wherein upon activation of power to the electric motor, the electric motor rotates the shaft, resulting in rotation of the coupler, the telescopic cylinder and the gripping element, thereby rotating a lightbulb to which the gripping element is attached.

14 Claims, 13 Drawing Sheets

(56) References Cited

U.S. PATENT DOCUMENTS

| | | | | |
|---|---|---|---|---|
| 4,901,606 A * | 2/1990 | Christensen | B25B 11/007 | 81/53.12 |
| 5,692,417 A * | 12/1997 | Irpino | A47L 13/38 | 81/53.1 |
| 6,739,220 B1 * | 5/2004 | Johnson | B25B 9/00 | 81/53.1 |
| 6,883,400 B2 * | 4/2005 | Sugano | H01K 3/32 | 294/184 |
| 7,152,266 B1 * | 12/2006 | Haughton | A46B 5/0033 | 15/28 |
| 7,331,077 B1 * | 2/2008 | Henry | A46B 5/0033 | 15/23 |
| 7,367,347 B2 * | 5/2008 | Field | A45B 7/00 | 135/66 |
| 7,743,683 B2 * | 6/2010 | Dayton | B25F 3/00 | 173/216 |
| 8,657,351 B2 * | 2/2014 | Johnson | A63F 9/0001 | 135/74 |
| 9,009,920 B1 * | 4/2015 | Ramsey | B25G 1/04 | 16/429 |
| 9,009,921 B1 * | 4/2015 | Ramsey | E04D 13/0765 | 16/429 |
| 9,056,393 B1 * | 6/2015 | Gary | B25J 1/02 | |
| D800,251 S * | 10/2017 | Feuerstein | D23/223 | |
| D825,190 S * | 8/2018 | Hu | D4/102 | |
| 10,077,031 B1 * | 9/2018 | Giwa | B60S 3/048 | |
| 2004/0189028 A1 * | 9/2004 | Newman | F16B 7/149 | 294/210 |
| 2005/0145077 A1 * | 7/2005 | Williams | B25J 15/10 | 81/101 |
| 2006/0290152 A1 * | 12/2006 | Robinson | H01J 9/003 | 294/184 |
| 2008/0092311 A1 * | 4/2008 | Munn | A46B 13/001 | 15/28 |
| 2008/0302215 A1 * | 12/2008 | Johnson | H01J 9/003 | 81/53.12 |
| 2011/0061498 A1 * | 3/2011 | Johnson | A47L 13/38 | 81/53.12 |
| 2012/0125161 A1 * | 5/2012 | Ellis | H01J 9/003 | 81/53.12 |
| 2013/0213187 A1 * | 8/2013 | Gatski | H01K 3/32 | 81/53.11 |

* cited by examiner

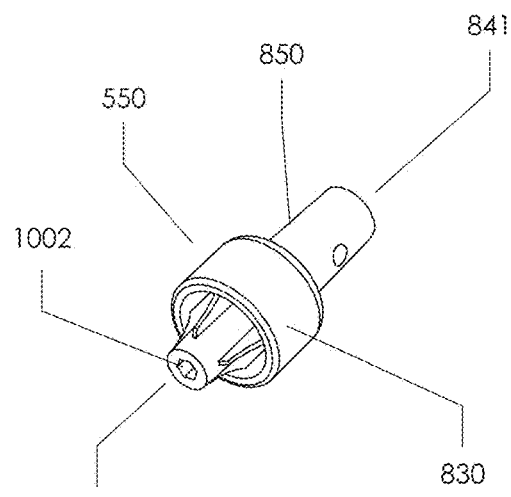
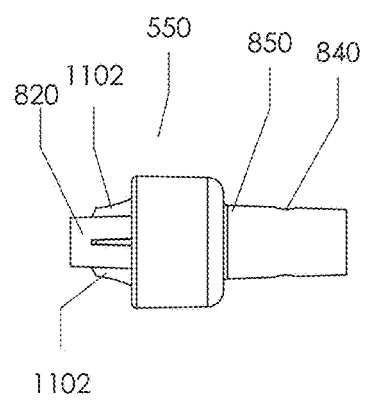
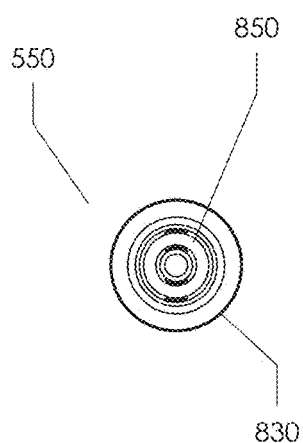
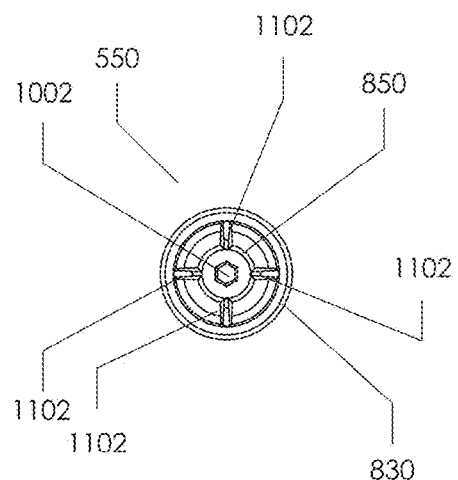
FIG. 10
FIG. 11
FIG. 12
FIG. 13

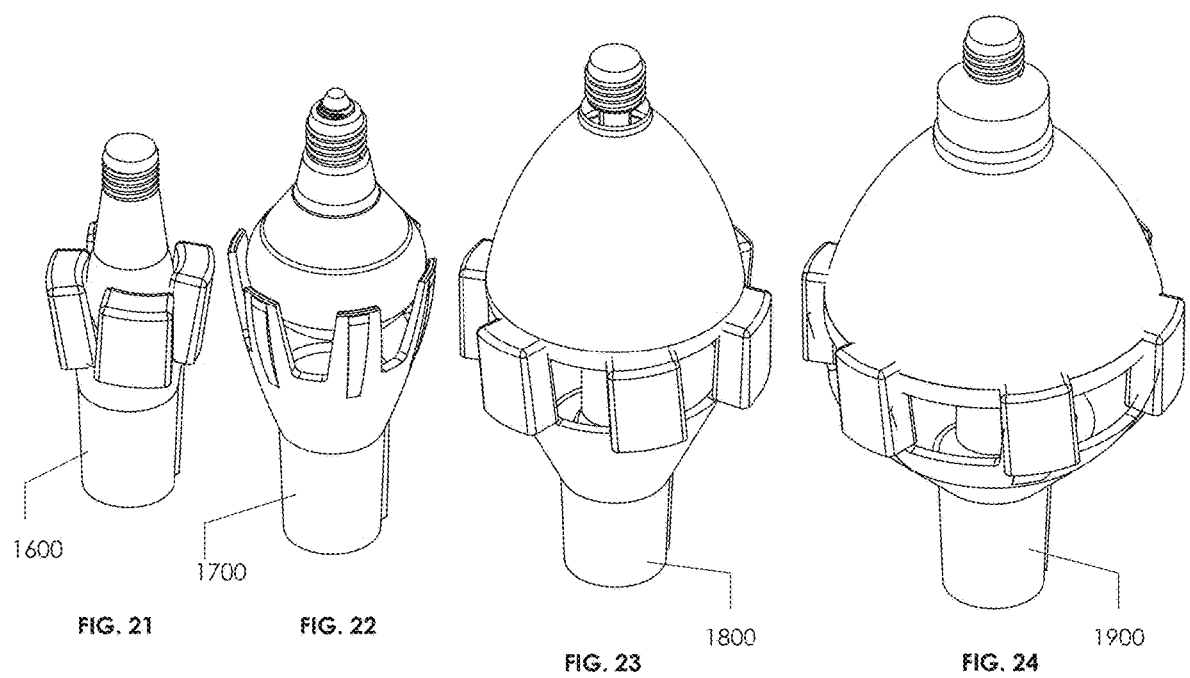

AUTOMATED TELESCOPIC LIGHTBULB ACCESS APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field of automation and, more specifically, relates to the field of automation of common commercial and household tasks.

BACKGROUND

Light bulbs consist of an air-tight glass enclosure (the envelope, or bulb) with a filament of metal inside the bulb, through which an electric current is passed. Contact wires and a base with two (or more) conductors provide electrical connections to the filament. Incandescent light bulbs usually contain a stem or glass mount anchored to the bulb's base that allows the electrical contacts to run through the envelope without air or gas leaks. The electrical contacts extend down to a conductive cap, which is connected to a lamp to power the bulb. Lamps have a screw base, also known as a socket, into which the cap is screwed. Thus, lightbulbs are screwed into and out of the screw base of lamps.

Light bulbs come in a variety of different shapes and sizes. Light sockets are also available in a variety of configurations, such as recessed sockets, protruding sockets, and sockets that face downwards, upwards, to the side, etc. Often, individuals must use ladders to reach the light bulbs for removal and installation. The ascending and descending of the ladder can be dangerous for the user, as the individual may fall while removing the light bulb from the socket. As a consequence, various extension rods with grasping calipers have been developed to help in the removal of light bulbs from high ceilings that aren't reachable from the ground. But the current solutions for removing and installing lightbulbs do not adequately automate the process and do not adequately account for the wide variety of shapes, sizes and configurations of lightbulbs and sockets.

Therefore, a need exists to overcome the problems with the prior art as discussed above, and particularly for a more efficient way of automating the process of installing and removing lightbulbs from lamp sockets, especially in locations and configurations that are difficult to reach.

SUMMARY

A device and system for installing and removing lightbulbs, is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an article is provided that solves the above-described problems. A device for installing and removing lightbulbs comprises a removable gripping element including a plurality of fingers configured for gripping a lightbulb, a telescopic cylinder having a proximal end and a distal end coupled to the gripping element, wherein the telescopic cylinder is adjustable to different lengths, and a base housing, comprising: a) an exterior ergonomic shape configured for accepting a human hand, b) an electric motor located within the housing, the electric motor having a rotating shaft, c) a battery located within the housing, wherein the battery provides power to the electric motor, d) a coupler for coupling the electric motor to the telescopic cylinder, the coupler comprising: 1) a tubular element having a first end and a second end, wherein the rotating shaft of the electric motor is inserted into an orifice in the first end, and wherein the second end is inserted into the proximal end of the telescopic cylinder, 2) a cylindrical element concentric with the tubular element, wherein the cylindrical element surrounds at least a portion of the tubular element, and 3) at least one flange that connects the cylindrical element to the tubular element, and e) a switch on an exterior surface of the base housing, the switch for activating power to the electric motor, wherein upon activation of power to the electric motor, the electric motor rotates the shaft, resulting in rotation of the coupler, the telescopic cylinder and the gripping element, thereby rotating a lightbulb to which the gripping element is attached.

BRIEF DESCRIPTION OF THE DRAWINGS

The accompanying drawings, which are incorporated in and constitute a part of this disclosure, illustrate various example embodiments. In the drawings:

FIGS. 10-13 depict different views of the coupler of the base housing of the device of FIG. 1, according to an example embodiment.

FIGS. 21-24 depict different sizes of the gripping element of the device of FIG. 1, in use with a lightbulb, according to an example embodiment.

DETAILED DESCRIPTION

Figure 1:
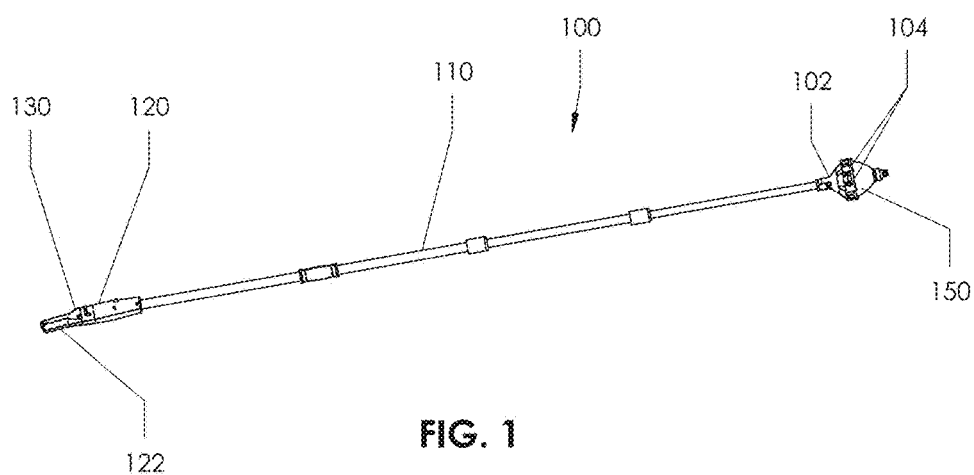
FIG. 1 depicts a perspective view of a device for installing and removing lightbulbs, according to an example embodiment.

The following detailed description refers to the accompanying drawings. Wherever possible, the same reference numbers are used in the drawings and the following description to refer to the same or similar elements. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing an automated, telescopic lightbulb access apparatus that is efficiently designed and allows consumers to easily install and remove lightbulbs, even in areas that are difficult to reach. The claimed subject matter presents an inexpensively manufactured telescopic lightbulb access apparatus that also allows for automated rotation of the lightbulb using an electric motor. This feature increases the usability of the device for installing and removing lightbulbs. Further, the claimed subject matter allows for the use of greater torque force when rotating the lightbulb, due to the design of a coupler that couples the electric motor with the telescopic cylinder. This feature facilitates situations where lightbulbs may be stuck or simply require higher torque force when installing or removing the lightbulb, thereby aiding the installation or removal process.

The accompanying drawings, which are incorporated in and constitute a part of this disclosure, illustrate various example embodiments. The claimed telescopic lightbulb access apparatus will now be described with respect to FIGS. 1 through 24. FIG. 1 depicts a perspective view of a device 100 for installing and removing lightbulbs, according to an example embodiment. FIG. 1 shows that the device 100 comprises a removable gripping element 102 including a plurality of fingers 104 configured for gripping a lightbulb 150. The device 100 also includes a telescopic cylinder 110 having a proximal end and a distal end coupled to the gripping element 102, wherein the telescopic cylinder is adjustable to different lengths. The device 100 also includes a base housing 120, comprising an exterior ergonomic shape 122 configured for accepting a human hand. The base housing 120 includes an electric motor (not shown) located within the housing, the electric motor having a rotating shaft, a battery (not shown) located within the housing, wherein the battery provides power to the electric motor, a coupler (not shown) for coupling the electric motor to the telescopic cylinder, and a switch 130 on an exterior surface of the base housing 120, the switch for activating power to the electric motor. Upon activation of power to the electric motor, the electric motor rotates the shaft, resulting in rotation of the coupler, the telescopic cylinder 110 and the gripping element 102, thereby rotating the lightbulb 150 to which the gripping element is attached.

Figure 2:
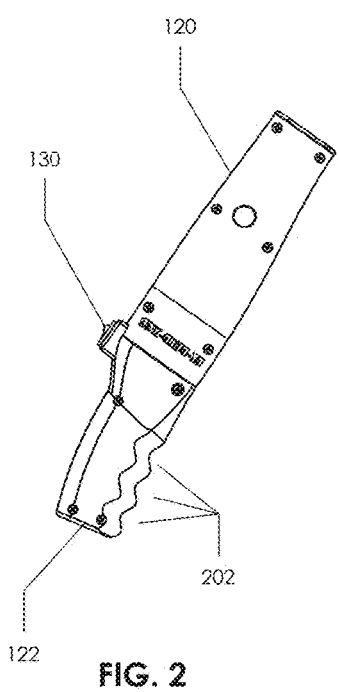
FIGS. 2 and 3 depict different views of the base housing of the device of FIG. 1, according to an example embodiment.
Figure 3:
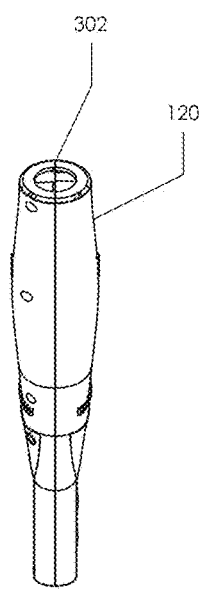

FIGS. 2 and 3 depict different views of the base housing 120 of the device 100 of FIG. 1, according to an example embodiment. FIGS. 2 and 3 show that the base housing 120 exhibits an exterior ergonomic shape 122 configured for accepting a human hand. The ergonomic shape 122 includes indentations or détentes 202 for accepting the fingers of a human hand. The base housing 120 includes a switch 130 on the exterior surface of the base housing 120, for activating power to the electric motor. The base housing 120 also includes an orifice 302, into which the telescopic cylinder 110 is inserted, for coupling to the coupler of the base housing 120.

Figure 4:
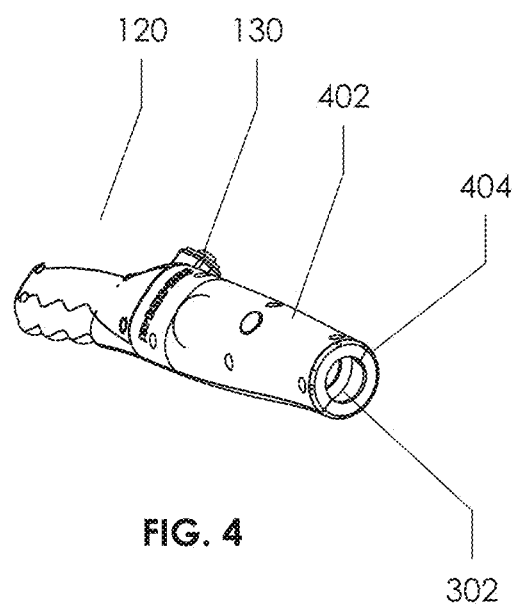
FIG. 4 depicts a perspective view of the base housing of the device of FIG. 1, according to an example embodiment.

FIG. 4 depicts a perspective view of the base housing 120 of the device 100 of FIG. 1, according to an example embodiment. FIG. 4 shows that the base housing 120 is composed of two approximately equal halves 402, 404 that are joined together, so as to define an interior volume of the base housing 120. The two halves 402, 404 are shown to be joined at approximately a midline, so as to create the base housing 120.

Figure 5:
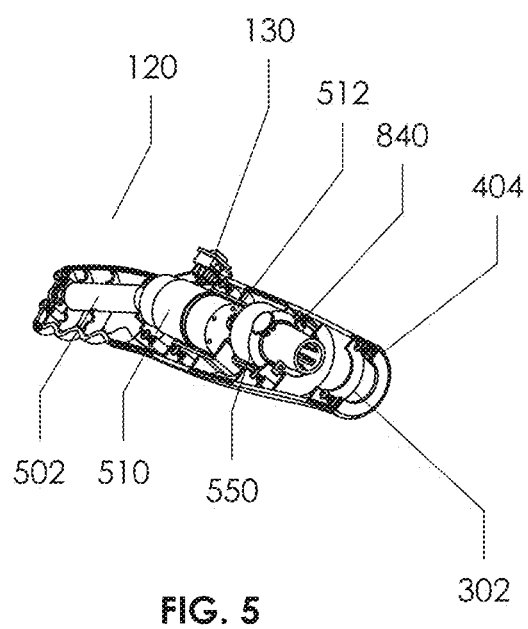
FIG. 5 depicts a perspective view of the base housing of the device of FIG. 1, wherein a portion of the housing has been removed, according to an example embodiment.

FIG. 5 depicts a perspective view of the base housing 120 of the device 100 of FIG. 1, wherein a portion of the base housing 120 has been removed, according to an example embodiment. FIG. 5 shows that half 402 of the base housing 120 has been removed, so as to illustrate the interior components of the base housing 120. The interior components of the base housing 120 include a battery 502, an electric motor 510, and a coupler 550. The battery 502 may be any rechargeable battery, such as a nickel cadmium battery, a nickel metal hydride battery, a lead acid battery, a lithium ion battery, a lithium polymer battery, an aluminum ion battery, a flow battery, a magnesium ion battery, alkaline battery, or the like. The electric motor 510 may be a self-commutated motor, or an externally commutated motor. The coupler 550 is described in greater detail below.

Figure 6:
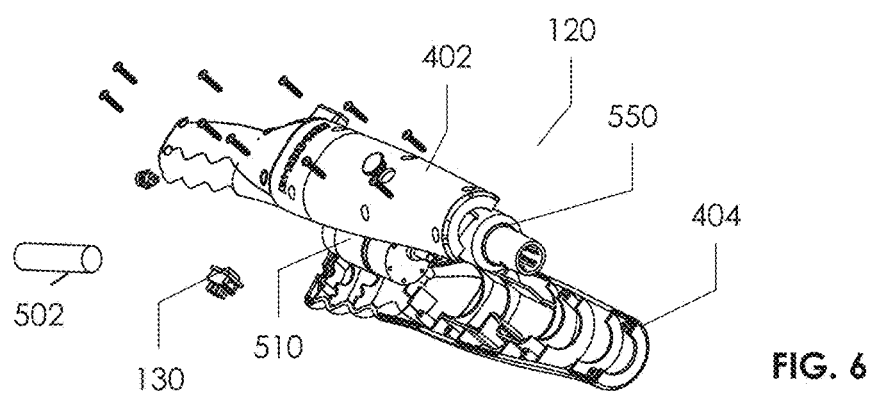
FIG. 6 depicts an exploded perspective view of the base housing of the device of FIG. 1, according to an example embodiment.

FIG. 6 depicts an exploded perspective view of the base housing 120 of the device 100 of FIG. 1, according to an example embodiment. FIG. 6 shows the relationship between the interior components of the base housing 120, including the battery 502, the electric motor 510, and the coupler 550. FIG. 6 also shows both halves 402, 404 of the housing 120, as well as the switch 130.

Figure 7:
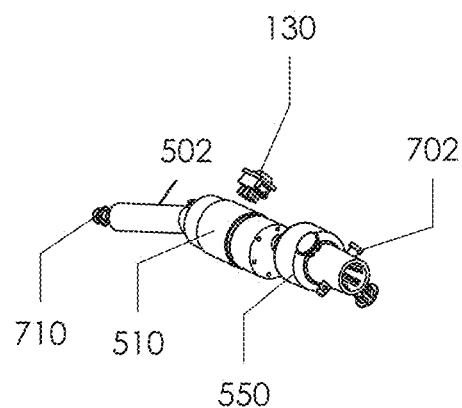
FIG. 7 depicts interior components of the base housing of the device of FIG. 1, according to an example embodiment.

FIG. 7 depicts the interior components of the base housing 120 of the device 100 of FIG. 1, according to an example embodiment. FIG. 7 shows the interior components of the base housing 120, including the battery 502, the electric motor 510, and the coupler 550. FIG. 7 also shows the switch 130, as well as an electrical input 710, or power element, located within the base housing 120, wherein the electrical input 710 comprises a socket for coupling with an external electrical adapter, wherein the electrical input 710 provides power to the electric motor 510 and/or the rechargeable battery. The electrical input 710 may be a female jack that accepts the insertion of a male AC or DC adapter. Alternatively, the electrical input 710 may be a male jack that inserts into a female AC or DC adapter. FIG. 7 further includes a pin 702 for coupling the coupler 550 to the telescopic cylinder 110, as described more fully below.

Figure 8:
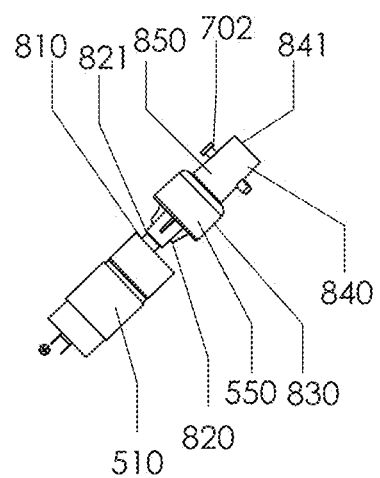
FIG. 8 depicts the coupler of the base housing of the device of FIG. 1, according to an example embodiment.

FIG. 8 depicts a close-up of the coupler 550 of the base housing 120 of the device 100 of FIG. 1, according to an example embodiment. FIG. 8 shows that the electric motor 510 includes a rotating shaft 810 that rotates when the electric motor 510 is activated and operating. FIG. 8 also shows that the coupler 550 includes a tubular element 850 having a first end 821 and a second end 841, wherein the rotating shaft 810 of the electric motor 510 is inserted into an orifice in the first end 821, such that the rotating shaft 810 of the electric motor 510 fits securely within the orifice in the first end 821. There may be a friction fit between the rotating shaft 810 of the electric motor 510 and the orifice in the first end 821. The tubular element 850 is divided into a proximal portion 820 having a first diameter, and a distal portion 840 having a second diameter greater than the first diameter. Also, the distal portion 840 may be tapered such that the diameter of distal portion 840 becomes smaller towards the second end 841. The coupler 550 may also include a cylindrical element 830 concentric with the tubular element 850, wherein the cylindrical element 830 surrounds at least a portion of the tubular element 850. The cylindrical element 830 is connected to the tubular element 850 via flanges, which are described in more detail below.

Figure 9:
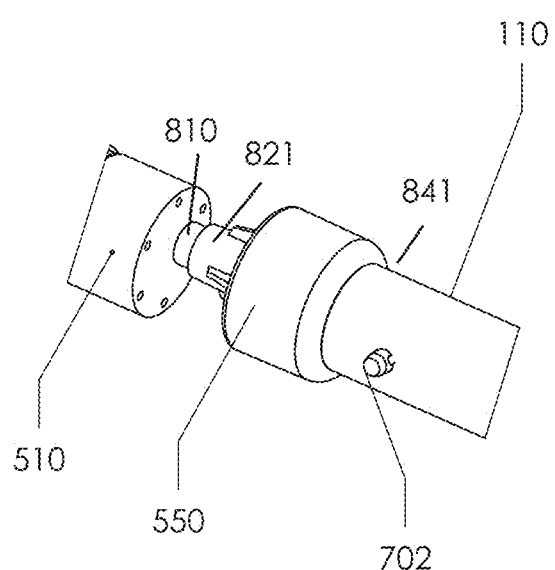
FIG. 9 depicts the coupler of the base housing of the device of FIG. 1, attached to the telescopic cylinder, according to an example embodiment.

FIG. 9 depicts a close-up of the coupler 550 of the base housing 120 of the device 100 of FIG. 1, attached to the proximal end of the telescopic cylinder 110, according to an example embodiment. FIG. 9 shows that the second end 841 of the tubular element 850 of the coupler 550 is inserted into the proximal end of the telescopic cylinder 110. FIG. 9 further shows that pin 702 couples the coupler 550 to the telescopic cylinder 110, wherein the pin 702 is inserted into an orifice in both walls of the distal portion 840 of coupler 550, as well as an orifice in both walls of the proximal end of the telescopic cylinder 110. This pin serves to securely attach the coupler 550 of the base housing 120 to the telescopic cylinder 110. Upon activation of power to the electric motor 510, the electric motor 510 rotates the shaft 810, resulting in rotation of the coupler 550, and the telescopic cylinder 110. FIG. 9 also shows that the rotating shaft 810 of the electric motor 510 is inserted into an orifice in the first end 821 of the coupler 550, such that the rotating shaft 810 of the electric motor 510 fits securely within the orifice in the first end 821.

FIGS. 10-13 depict different views of the coupler of the base housing of the device of FIG. 1, according to an example embodiment. FIG. 10 shows a side perspective view of the coupler 550, while FIG. 11 shows a side view of the coupler 550. FIG. 12 shows a front view of the coupler 550, while FIG. 13 shows a rear view of the coupler 550. The coupler 550 includes a tubular element 850 having a first end 821 and a second end 841. The tubular element 850 is divided into a proximal portion 820 having a first diameter, and a distal portion 840 having a second diameter greater than the first diameter. Also, the distal portion 840 may be tapered such that the diameter of distal portion 840 becomes smaller towards the second end 841. An orifice 1002 in the proximal portion 820 is configured to accept the shaft of the electric motor.

The coupler 550 may also include a cylindrical element 830 concentric with the tubular element 850, wherein the cylindrical element 830 surrounds at least a portion of the tubular element 850. All or most of the cylindrical element 830 may be substantially parallel to the tubular element 850. FIG. 11, for example, shows that proximal portion 820 and distal portion 840 of tubular element 850 extend beyond the cylindrical element 830, such that said portions jut out or protrude from cylindrical element 830.

At least one flange 1102 connects the cylindrical element 830 to the tubular element 850. The figures show that in one embodiment, four flanges 1102 connect the cylindrical element 830 to the tubular element 850. The four flanges 1102 are equally spaced around the exterior circumference of the tubular element 850, and the interior circumference of the cylindrical element 830. Each flange may be a flat, planar element that extends perpendicular to the cylindrical element 830 and the tubular element 850, so as to join the cylindrical element 830 to the tubular element 850. Each flange provides structural support to the entire coupler 550.

Figure 14:
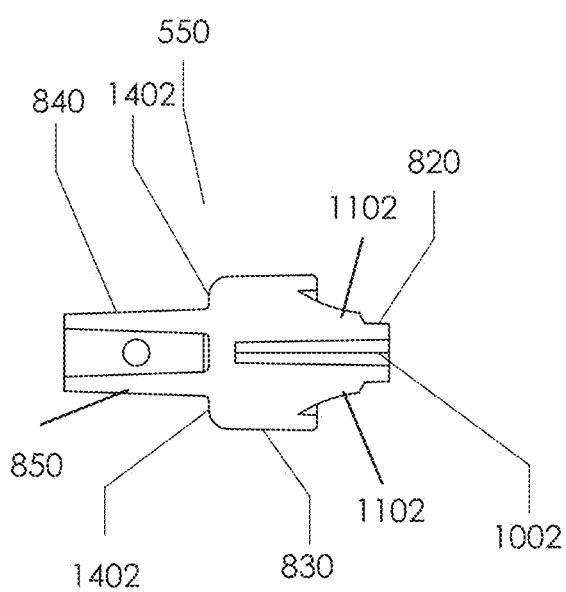
FIG. 14 depicts a side cross-sectional view of the coupler of the base housing of the device of FIG. 1, according to an example embodiment.

FIG. 14 depicts a side cross-sectional view of the coupler 550 of the base housing 120 of the device 100 of FIG. 1, according to an example embodiment. FIG. 14 shows that the tubular element 850 is divided into a proximal portion 820 having a first diameter, and a distal portion 840 having a second diameter greater than the first diameter. Also, the distal portion 840 may be tapered such that the diameter of distal portion 840 becomes smaller towards the second end 841. An orifice 1002 in the proximal portion 820 is configured to accept the shaft of the electric motor. The coupler 550 may also include a cylindrical element 830 concentric with the tubular element 850, wherein the cylindrical element 830 surrounds at least a portion of the tubular element 850. FIG. 14 also shows that one end 1402 of the cylindrical element 830 curves downwards so as to contact and couple with the tubular element 850. FIG. 14 also shows a cross section of least two flange 1102 that connect the cylindrical element 830 to the tubular element 850. The other figures show that in one embodiment, four flanges 1102 connect the cylindrical element 830 to the tubular element 850.

The purpose or effect of the design of coupler 550 is to efficiently and securely translate the torque force of the rotating shaft of the electric motor 510. The rotating shaft 810 of the electric motor 510 is inserted into an orifice in the first end 821 of the coupler 550, such that the rotating shaft 810 of the electric motor 510 fits securely within the orifice in the first end 821. Also, the second end 841 of the tubular element 850 of the coupler 550 is inserted into the proximal end of the telescopic cylinder 110. High torque forces due to the rotation of the motor's shaft cause large amounts of force to be exerted at directions tangential to, and perpendicular to, the tubular element of the coupler 550. The improved design of the coupler 550 allows the coupler to be able to translate the high torque forces of the rotating shaft of the electric motor 510 to the telescopic cylinder 110 without breaking, and without significant flex offset from the longitudinal axis of the coupler 550, while maintaining a wall thickness that is economical to manufacture.

Note the cylindrical element 830 surrounds at least a portion of the tubular element 850. The cylindrical element 830 acts to provide structural support to the tubular element 850, so as to counteract the high torque forces of the rotating shaft of the electric motor 510. Further, the flanges 1102 of the coupler 550 provides additional support to the tubular element 850, so as to further counteract the high torque forces. The flanges 1102 also act to counteract the forces exerted at directions tangential to, and perpendicular to, the tubular element of the coupler 550. This allows the coupler 550 to more efficiently translate the rotational forces from the motor to the telescopic cylinder without breaking or flexing offset from the main longitudinal axis, while maintaining a wall thickness that is still economical.

A conventional coupler shaped like a single cylinder and having the same wall thickness as coupler 550 would not be able to adequately withstand the high torque forces required to rotate the telescopic cylinder 110. Said conventional coupler would break, and/or would experience significant flex offset from the longitudinal axis of the coupler, which would impede the functionality of the system.

Figure 15:
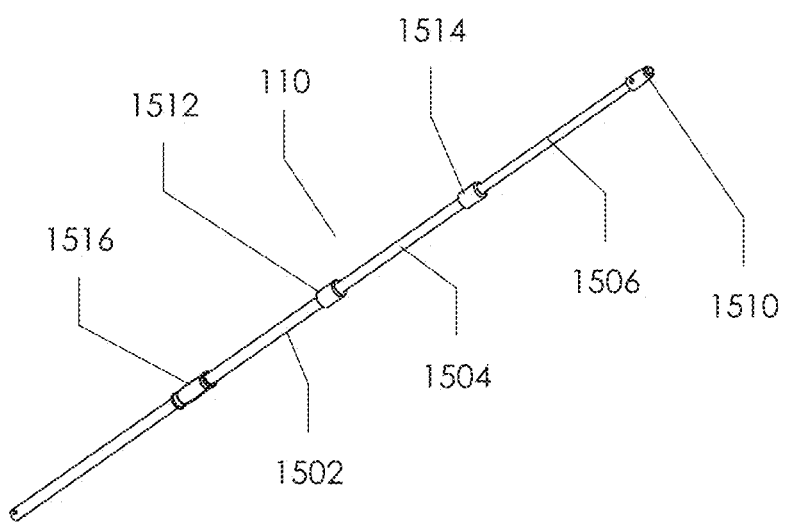
FIG. 15 depicts the telescopic cylinder of the device of FIG. 1, according to an example embodiment.
Figures 16, 17, 18, 19:
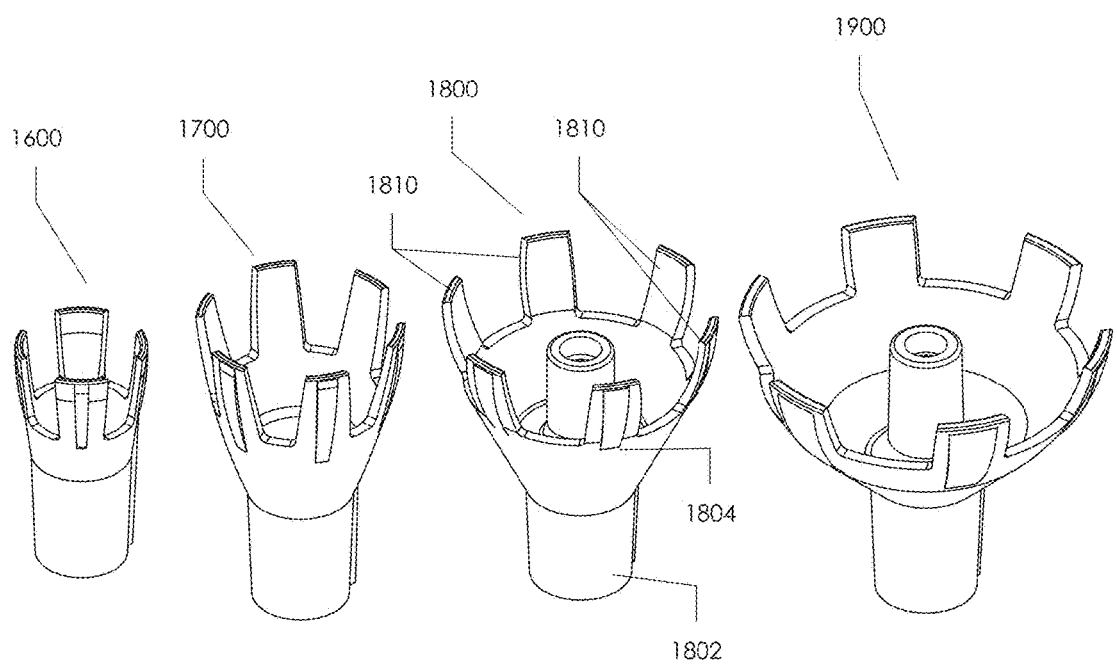
FIGS. 16-19 depict different sizes of the gripping element of the device of FIG. 1, according to an example embodiment.

FIG. 15 depicts the telescopic cylinder 110 of the device 100 of FIG. 1, according to an example embodiment. FIG. 15 shows that the telescopic cylinder 110 may comprise of three sections 1502, 1504 and 1506, wherein section 1506 may be retracted into section 1504 and section 1504 may be retracted into section 1502. Adjusting sleeve 1512 may be used by the user to adjust the length of section 1504 in relation to section 1502. Adjusting sleeve 1514 may be used by the user to adjust the length of section 1506 in relation to section 1504. The end element 1510 is used to couple the distal end of the telescopic cylinder 110 to the gripping element 102 of the device 100. Lastly, the hand grip 1516 may comprise soft material that provides a grip for a use to hold the telescopic cylinder 110 with this hands.

FIGS. 16-19 depict different sizes of the gripping element 102 of the device 100 of FIG. 1, according to an example embodiment. The gripping elements 1600, 1700, 1800 and 1900 illustrate increasingly larger gripping elements. Using gripping element 1800 as an example, each gripping element includes a cylindrical base 1802, a conical protrusion 1804 connected to a top end of the cylindrical base 1802, and a plurality of tabs or fingers 1810 that protrude from a top of the conical protrusion 1804. The plurality of tabs or fingers 1810 are evenly spaced or distributed along a top circumference of the conical protrusion 1804. The longer the top circumference of the conical protrusion, the more fingers or tabs the gripping element may have. Gripping element 1600 includes four tabs or fingers, gripping element 1700 includes six tabs or fingers, gripping element 1800 includes six tabs or fingers, and gripping element 1900 includes six tabs or fingers.

As a gripping element encounters a lightbulb, the gripping element is pushed onto the top portion of the lightbulb. The fingers or tabs spread to allow the top portion of the lightbulb to enter the volume of the conical protrusion. As this occurs, the fingers or tabs apply pressure on the top portion of the lightbulb and therefore grip the top portion of the lightbulb. Subsequently, when the gripping element begins to rotate, the lightbulb will be installed into a lamp socket or removed from a light socket, depending on the direction of the rotation.

Figure 20:
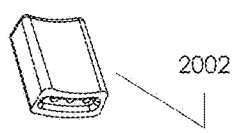
FIG. 20 depicts a tip of the gripping element of the device of FIG. 1, according to an example embodiment.

FIG. 20 depicts a tip 2002 of the gripping element 102 of the device 100 of FIG. 1, according to an example embodiment. Each tab or finger can be covered by a tip 2002, which may be composed of a rubber material for greater gripping onto a lightbulb.

FIGS. 21-24 depict different sizes of the gripping element 102 of the device 150 of FIG. 1, in use with a lightbulb, according to an example embodiment. The gripping elements 1600, 1700, 1800 and 1900 illustrate increasingly larger gripping elements gripping lightbulbs of various sizes. Gripping element 1600 grips a lightbulb with four tabs or fingers, gripping element 1700 grips a lightbulb with six tabs or fingers, gripping element 1800 grips a lightbulb with six tabs or fingers, and gripping element 1900 grips a lightbulb with six tabs or fingers.

In one embodiment, a system for installing and removing lightbulbs, comprises a plurality of removable gripping elements of different sizes (such as gripping elements 1600, 1700, 1800 and 1900), each of said removable gripping element including a plurality of fingers configured for gripping a lightbulb. The system also includes a telescopic cylinder having a proximal end and a distal end coupled to one of the plurality of gripping elements, wherein the telescopic cylinder is adjustable to different lengths, and a base housing, comprising: a) an exterior ergonomic shape configured for accepting a human hand; b) an electric motor located within the housing, the electric motor having a rotating shaft; c) a rechargeable battery located within the housing, wherein the battery provides power to the electric motor; d) a coupler for coupling the electric motor to the telescopic cylinder, the coupler comprising: 1) a tubular element having a first end and a second end, wherein the rotating shaft of the electric motor is inserted into an orifice in the first end, and wherein the second end is inserted into the proximal end of the telescopic cylinder; 2) a cylindrical element concentric with the tubular element, wherein the cylindrical element surrounds at least a portion of the tubular element; and 3) at least one flange that connects the cylindrical element to the tubular element; and e) a switch on an exterior surface of the base housing, the switch for activating power to the electric motor; wherein upon activation of power to the electric motor, the electric motor rotates the shaft, resulting in rotation of the coupler, the telescopic cylinder and said gripping element, thereby rotating a lightbulb to which the gripping element is attached.

In one embodiment, any of the components of the device 100 described above, including the base housing, the telescopic cylinder and the plurality of gripping elements are comprised of electrically non-conductive and thermally non-conductive material.

Embodiments may be described above with reference to functions or acts, which comprise methods. The functions/acts noted above may occur out of the order as shown or described. For example, two functions/acts shown or described in succession may in fact be executed substantially concurrently or the functions/acts may sometimes be executed in the reverse order, depending upon the functionality/acts involved. While certain embodiments have been described, other embodiments may exist. Further, the disclosed methods' functions/acts may be modified in any manner, including by reordering functions/acts and/or inserting or deleting functions/acts, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device for installing and removing lightbulbs, the device comprising:
   a removable gripping element including a plurality of fingers configured for gripping a lightbulb;
   a telescopic cylinder having a proximal end and a distal end coupled to the gripping element, wherein the telescopic cylinder is adjustable to different lengths; and
   a base housing, comprising:
   a) an exterior ergonomic shape configured for accepting a human hand;
   b) an electric motor located within the housing, the electric motor having a rotating shaft;
   c) a rechargeable battery located within the housing, wherein the battery provides power to the electric motor;
   d) a coupler for coupling the electric motor to the telescopic cylinder, the coupler comprising:
      1) a tubular element having a first end and a second end, wherein the rotating shaft of the electric motor is inserted into an orifice in the first end, and wherein the second end is inserted into the proximal end of the telescopic cylinder;

2) a cylindrical element concentric with the tubular element, wherein the cylindrical element surrounds at least a portion of the tubular element; and 3) at least one flange that connects the cylindrical element to the tubular element; and e) a switch on an exterior surface of the base housing, the switch for activating power to the electric motor;

wherein upon activation of power to the electric motor, the electric motor rotates the shaft, resulting in rotation of the coupler, the telescopic cylinder and the gripping element, thereby rotating a lightbulb to which the gripping element is attached.

2. The device of claim 1, further comprising a hand grip on the telescopic cylinder.

3. The device of claim 2, wherein the base housing, the telescopic cylinder and the gripping element are comprised of electrically non-conductive and thermally non-conductive material.

4. The device of claim 1, further comprising a power element located within the housing, wherein the power element comprises a socket for coupling with an external electrical adapter, wherein the power element provides power to the electric motor.

5. The device of claim 1, further comprising a power element located within the housing, wherein the power element comprises a socket for coupling with an external electrical adapter, wherein the power element provides power to recharge the battery.

6. A device for installing and removing lightbulbs, the device comprising:
   a removable gripping element including a plurality of fingers configured for gripping a lightbulb;
   a telescopic cylinder having a proximal end and a distal end coupled to the gripping element, wherein the telescopic cylinder is adjustable to different lengths; and
   a base housing, comprising:
      a) an exterior ergonomic shape configured for accepting a human hand;
      b) an electric motor located within the housing, the electric motor having a rotating shaft;
      c) a power element located within the housing, wherein the power element comprises a socket for coupling with an external electrical adapter, wherein the power element provides power to the electric motor;
      d) a coupler for coupling the electric motor to the telescopic cylinder, the coupler comprising:
         1) a tubular element having a first end and a second end, wherein the rotating shaft of the electric motor is inserted into an orifice in the first end, and wherein the second end is inserted into the proximal end of the telescopic cylinder;
         2) a cylindrical element concentric with the tubular element, wherein the cylindrical element surrounds at least a portion of the tubular element; and
         3) at least one flange that connects the cylindrical element to the tubular element; and
      e) a switch on an exterior surface of the base housing, the switch for activating power to the electric motor;
   wherein upon activation of power to the electric motor, the electric motor rotates the shaft, resulting in rotation of the coupler, the telescopic cylinder and the gripping element, thereby rotating a lightbulb to which the gripping element is attached.

7. The device of claim 6, further comprising a hand grip on the telescopic cylinder.

8. The device of claim 7, wherein the base housing, the telescopic cylinder and the gripping element are comprised of electrically non-conductive and thermally non-conductive material.

9. The device of claim 6, wherein the power element provides power to recharge the battery.

10. A system for installing and removing lightbulbs, the system comprising:
   a plurality of removable gripping elements of different sizes, each of said removable gripping element including a plurality of fingers configured for gripping a lightbulb;
   a telescopic cylinder having a proximal end and a distal end coupled to one of the plurality of gripping elements, wherein the telescopic cylinder is adjustable to different lengths; and
   a base housing, comprising:
      a) an exterior ergonomic shape configured for accepting a human hand;
      b) an electric motor located within the housing, the electric motor having a rotating shaft;
      c) a rechargeable battery located within the housing, wherein the battery provides power to the electric motor;
      d) a coupler for coupling the electric motor to the telescopic cylinder, the coupler comprising:
         1) a tubular element having a first end and a second end, wherein the rotating shaft of the electric motor is inserted into an orifice in the first end, and wherein the second end is inserted into the proximal end of the telescopic cylinder;
         2) a cylindrical element concentric with the tubular element, wherein the cylindrical element surrounds at least a portion of the tubular element; and
         3) at least one flange that connects the cylindrical element to the tubular element; and
      e) a switch on an exterior surface of the base housing, the switch for activating power to the electric motor;
   wherein upon activation of power to the electric motor, the electric motor rotates the shaft, resulting in rotation of the coupler, the telescopic cylinder and said gripping element, thereby rotating a lightbulb to which the gripping element is attached.

11. The system of claim 10, further comprising a hand grip on the telescopic cylinder.

12. The system of claim 11, wherein the base housing, the telescopic cylinder and the plurality of gripping elements are comprised of electrically non-conductive and thermally non-conductive material.

13. The system of claim 10, further comprising a power element located within the housing, wherein the power element comprises a socket for coupling with an external electrical adapter, wherein the power element provides power to the electric motor.

14. The system of claim 10, further comprising a power element located within the housing, wherein the power element comprises a socket for coupling with an external electrical adapter, wherein the power element provides power to recharge the battery.

* * * * *